US012579748B2

(12) United States Patent
Gai

(10) Patent No.: US 12,579,748 B2
(45) Date of Patent: Mar. 17, 2026

(54) METHODS, APPARATUSES, TERMINALS AND STORAGE MEDIA FOR DISPLAY CONTROL BASED ON EXTENDED REALITY

(71) Applicant: Beijing Zitiao Network Technology Co., Ltd., Beijing (CN)

(72) Inventor: Weidong Gai, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 153 days.

(21) Appl. No.: 18/501,322

(22) Filed: Nov. 3, 2023

(65) Prior Publication Data

US 2024/0153211 A1    May 9, 2024

(30) Foreign Application Priority Data

Nov. 3, 2022    (CN) .......................... 202211369275.3

(51) Int. Cl.
| | |
|---|---|
| *G06T 17/20* | (2006.01) |
| *G06F 3/01* | (2006.01) |
| *G06T 15/30* | (2011.01) |
| *G06T 19/00* | (2011.01) |

(52) U.S. Cl.
CPC ................ *G06T 17/20* (2013.01); *G06F 3/01* (2013.01); *G06F 3/011* (2013.01); *G06F 3/012* (2013.01); *G06F 3/014* (2013.01); *G06F 3/017* (2013.01); *G06T 15/30* (2013.01); *G06T 19/006* (2013.01)

(58) Field of Classification Search
CPC ....... G06T 17/20; G06T 15/30; G06T 19/006; G06F 3/01; G06F 3/011; G06F 3/012; G06F 3/013; G06F 3/014; G06F 3/016; G06F 3/017; G09G 3/001
See application file for complete search history.

(56) References Cited

U.S. PATENT DOCUMENTS

| | | | | |
|---|---|---|---|---|
| 10,706,584 B1 * | 7/2020 | Ye | .......................... | G06F 18/214 |
| 10,928,899 B2 * | 2/2021 | Krishnakumar | ........ | G06F 3/011 |
| 10,943,407 B1 * | 3/2021 | Morgan | ................ | G16H 15/00 |
| 11,222,474 B2 * | 1/2022 | Kopeinigg | ............. | G06V 40/28 |
| 11,232,591 B1 * | 1/2022 | Twigg | .................... | G06F 3/012 |
| 11,775,836 B2 * | 10/2023 | Chidananda | ........... | G06V 40/11 |
| | | | | 382/103 |
| 11,893,696 B2 * | 2/2024 | Lane | ..................... | G06T 15/005 |
| 2022/0086205 A1 * | 3/2022 | LeBeau | ................... | G06F 3/011 |

* cited by examiner

*Primary Examiner* — Vijay Shankar
(74) *Attorney, Agent, or Firm* — Astute IP Law Group

(57) ABSTRACT

This disclosure provides a method, apparatus, terminal, and storage medium for display control based on extended reality. This disclosure provides a method for display control based on extended reality, including: determining node positions of at least two skeletal nodes of a user in a real space; determining a moving direction, and determining a starting position and a moving distance based on the node positions of the at least two skeletal nodes; travelling, in an extended reality space, the moving distance along the moving direction from the starting position to reach a final position; and displaying a visual element at the final position in the extended reality space. This disclosure can avoid the visual element from overlapping with the body of the user.

20 Claims, 5 Drawing Sheets

DETERMINE NODE POSITIONS OF AT LEAST TWO SKELETAL NODES OF A USER IN A REAL SPACE — S11

DETERMINE A MOVING DIRECTION, AND DETERMINING A STARTING POSITION AND A MOVING DISTANCE BASED ON THE NODE POSITIONS OF THE AT LEAST TWO SKELETAL NODES — S12

TRAVEL, IN AN EXTENDED REALITY SPACE, THE MOVING DISTANCE ALONG THE MOVING DIRECTION FROM THE STARTING POSITION TO REACH A FINAL POSITION — S13

DISPLAY A VISUAL ELEMENT AT THE FINAL POSITION IN THE EXTENDED REALITY SPACE — S14

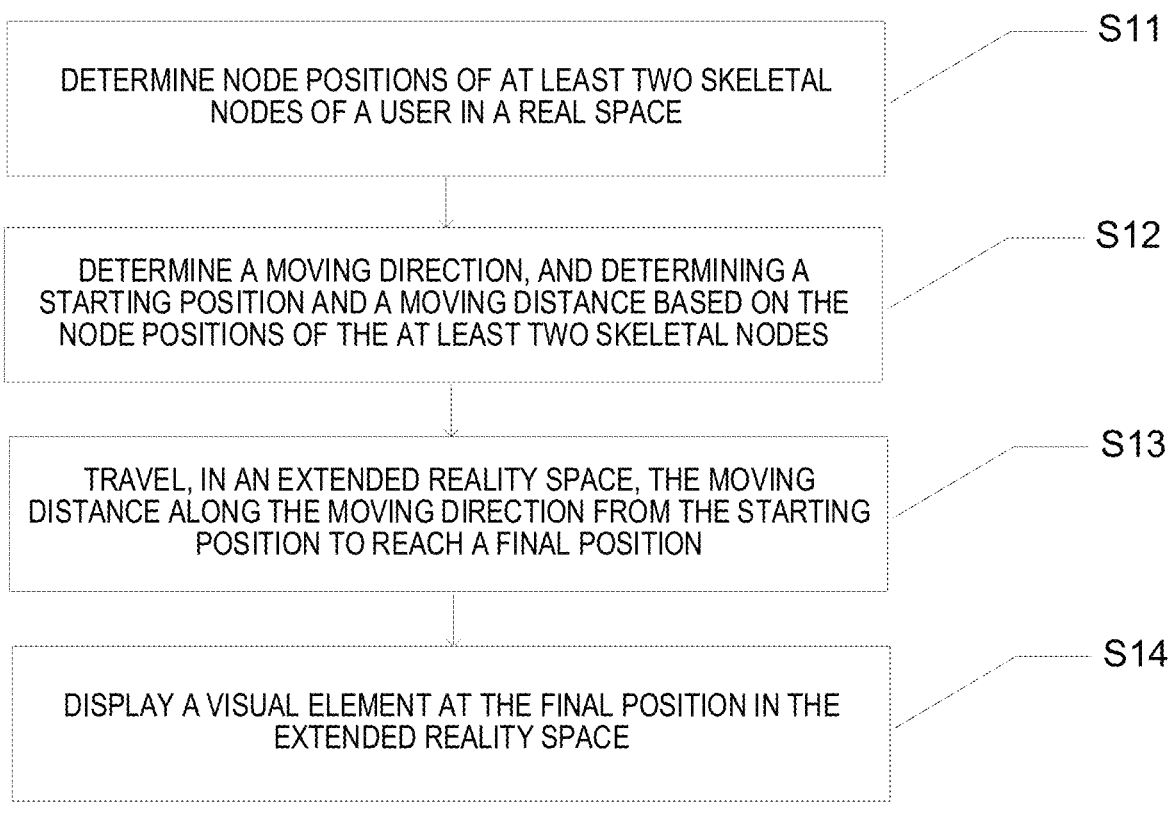

S11

DETERMINE NODE POSITIONS OF AT LEAST TWO SKELETAL
NODES OF A USER IN A REAL SPACE

S12

DETERMINE A MOVING DIRECTION, AND DETERMINING A
STARTING POSITION AND A MOVING DISTANCE BASED ON THE
NODE POSITIONS OF THE AT LEAST TWO SKELETAL NODES

S13

TRAVEL, IN AN EXTENDED REALITY SPACE, THE MOVING
DISTANCE ALONG THE MOVING DIRECTION FROM THE STARTING
POSITION TO REACH A FINAL POSITION

S14

DISPLAY A VISUAL ELEMENT AT THE FINAL POSITION IN THE
EXTENDED REALITY SPACE

METHODS, APPARATUSES, TERMINALS AND STORAGE MEDIA FOR DISPLAY CONTROL BASED ON EXTENDED REALITY

CROSS REFERENCE TO RELATED APPLICATIONS

The present application claims priority to Chinese Patent Application No. 202211369275.3, entitled "METHODS, APPARATUSES, TERMINALS AND STORAGE MEDIA FOR DISPLAY CONTROL BASED ON EXTENDED REALITY," filed on Nov. 3, 2022, the contents of which are hereby incorporated by reference in its entirety.

FIELD

The present disclosure relates to the technical field of extended reality, and more particularly to a method, apparatus, terminal and storage medium for display control based on extended reality.

BACKGROUND

Extended reality refers to creating a virtual environment that enables human-machine interaction by combining reality and virtuality by a computer, which can include various technologies such as virtual reality, augmented reality, and mixed reality. Visual elements that follow a user can be displayed in extended reality.

SUMMARY

The present disclosure provides methods, apparatuses, terminals and storage media for display control based on extended reality.

This disclosure adopts the following technical solution.

In some embodiments, the present disclosure provides a method for display control based on extended reality, comprising:

determining node positions of at least two skeletal nodes of a user in a real space;

determining a moving direction, and determining a starting position and a moving distance based on the node positions of the at least two skeletal nodes;

travelling, in an extended reality space, the moving distance along the moving direction from the starting position to reach a final position; and displaying a visual element at the final position in the extended reality space.

In some embodiments, the present disclosure provides an apparatus for display control based on extended reality, comprising:

a determination unit configured to determine node positions of at least two skeletal nodes of a user in a real space;

the determining unit further configured to determine a moving direction and determining a starting position and a moving distance based on the node positions of the at least two skeletal nodes;

the determining unit further configured to travel, in extended reality space, the moving distance along the moving direction from the starting position to reach a final position; and a display unit configured to display a visual element at the final position in the extended reality space.

In some embodiments, the present disclosure provides an terminal comprising: at least one memory and at least one processor;

wherein the memory is configured to store program code, and the processor is configured to recall the program code stored in the memory to perform the method described above.

In some embodiments, the present disclosure provides a computer-readable storage medium for storing program code that, when executed by a computer, causes the computer to perform any of the methods described above.

The present disclosure provides a method for display control based on extended reality, comprising: determining node positions of at least two skeletal nodes of a user in a real space; determining a moving direction, and determining a starting position and a moving distance based on the node positions of the at least two skeletal nodes; travelling, in an extended reality space, the moving distance along the moving direction from the starting position to reach a final position; and displaying a visual element at the final position in the extended reality space. The embodiments of the present disclosure can avoid a visual element from overlapping with the user's body.

BRIEF DESCRIPTION OF DRAWINGS

In conjunction with the drawings and with reference to the following specific implementations, the above and other features, advantages and aspects of various embodiments of the present disclosure will become more apparent. Throughout the drawings, identical or similar reference numbers indicate identical or similar elements. It should be understood that the drawings are schematic and that the components and elements are not necessarily drawn to scale.

FIG. 2 is a flowchart of a method for display control based on extended reality of an embodiment of the present disclosure.

DETAILED DESCRIPTION

Embodiments of the present disclosure are described in more detail with reference to the drawings below. Although certain embodiments of the present disclosure are shown in the accompanying drawings, it should be understood that the present disclosure may be implemented in various forms and should not be interpreted as limited to the embodiments set forth herein. Instead, these embodiments are provided for a more thorough and complete understanding of the present disclosure. It should be understood that the drawings and embodiments of the present disclosure are for illustrative purposes only and are not intended to limit the scope of protection of the disclosure.

It should be understood that the various steps described in the method implementations of the present disclosure may be performed in a different sequence and/or in parallel. In addition, the method implementations may include additional steps and/or omit the steps shown in the performance. The scope of this disclosure is not limited in this respect.

The term "including" as used herein and its variants are openly inclusive, i.e., "including but not limited to." The term "based" is "based at least in part." The term "one embodiment" means "at least one embodiment"; the term "another embodiment" means "at least one additional embodiment"; the term "some embodiments" means "at least some embodiments". Relevant definitions of other terms are given in the description below.

It should be noted that references to "first", "second" and other concepts in this disclosure are used only to distinguish between different apparatuses, modules or units and are not used to define the sequence or interdependence of functions performed by such apparatuses, modules or units.

It should be note that references to the modifications of "one" in this disclosure are indicative rather than restrictive and should be understood by those skilled in the art to mean "one or more" unless expressly stated otherwise in the context.

The names of messages or information interacted among multiple apparatuses in implementations of this disclosure are used only for illustrative purposes and are not intended to limit the scope of such messages or information.

The scheme provided in embodiments of the present application will be describes in detail below in conjunction with the accompanying drawings.

Figure 1:
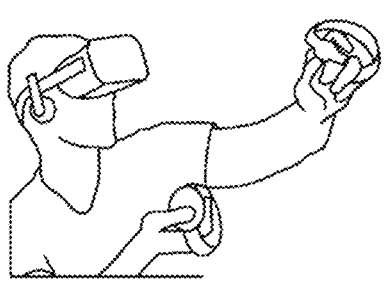
FIG. 1 is a schematic diagram for using an extended reality device of an embodiment of the present disclosure.

The extended reality can be at least one of virtual reality, augmented reality, or mixed reality. Taking virtual reality as an example of the extended reality, as shown in FIG. 1, a user can enter a virtual reality space through an intelligent terminal device such as a head-mounted VR glasses and control his/her avatar in the virtual reality space to engage in social interaction, entertainment, learning, and remote work, etc. with avatars controlled by other users.

The virtual reality space therein can be a simulation environment of a real world, a semi-simulated and semi-fictional virtual scene, or a completely fictional virtual scene. The virtual scene can be any one of a 2-dimension virtual scene, a 2.5-dimension virtual scene, or a 3-dimension virtual scene. Embodiments of the present application do not limit the dimensions of the virtual scene. For example, the virtual scene can include sky, land, ocean, etc., and the land can include environmental elements such as a desert and a city. The user can control virtual objects to move in the virtual scene.

In one embodiment, the user can perform relevant interactive operations in the virtual reality space by an operating device, which can be a handle. For example, the user performs relevant operation control by operating on buttons of the handle. Undoubtedly, gestures, voice, or multimodality control methods can also be used to control target objects in the virtual reality device without using a controller in other embodiments.

In some embodiments of the present disclosure, the proposed control method can be used for a virtual reality device, which is a terminal for enabling virtual reality effects and can usually be provided in the form of glasses, a head-mounted display (HMD), and contact lenses for enabling visual perception and other forms of perception. The form of a virtual reality device implementation is not limited to this and can be further miniaturized or enlarged as needed undoubtedly.

The virtual reality device recited in the present disclosure can include but is not limited to the following types:

a computer-side virtual reality (PCVR) device, wherein a PC-side is used to perform relevant calculations and data output of virtual reality functions and an external computer-side virtual reality device uses the data output by the PC-side to enable virtual reality effects.

a mobile virtual reality device, which supports setting a mobile terminal (such as a smart phone) in various ways (such as a head mounted display configured with a dedicated card slot), wherein the mobile terminal performs virtual reality related calculations and outputs data to the mobile virtual reality device via a wire or wireless connection to the mobile terminal, such as watching a virtual reality video by means of an APP of the mobile terminal.

an all-in-one virtual reality device, which has a processor for performing relevant calculations for virtual functions, so it has independent virtual reality input and output functions and does not need to be connected to a PC-side or mobile terminal. It gives more freedom in use.

The virtual reality device can render a virtual reality image in the virtual reality space. An underlying system of the virtual reality device often use an operating system such as Android and IOS, and it is not possible to directly perform a touch operation on a displayed virtual reality image, so an operation event performed via the virtual reality image cannot be directly performed by the underlying system.

The extended reality in some embodiments of the present disclosure can be AR (Augmented Reality): the AR set refers to a simulated set in which at least one virtual object is superimposed on a physical set or its representation. For example, an electronic system may have an opaque display and at least one imaging sensor, which is used to capture images or videos of the physical set. These images or videos are representations of the physical set. The system combines the images or videos with virtual objects and displays the combination on the opaque display. Individuals use the system to indirectly view the physical set via the images or videos of the physical set and observe the virtual objects superimposed on the physical set. In the case that the system captures images of the physical set using the one or more image sensors and renders the AR set on the opaque display using those images, the displayed images is referred to as a video transparent transmission. Alternatively, the electronic system used to display the AR set may have a transparent or translucent display through which individuals can directly view the physical set. This system may display virtual objects on the transparent or translucent display, enabling individuals to use this system to observe virtual objects superimposed on the physical set. As another example, the system may include a projection system that can project virtual objects onto a physical surface. The virtual objects can be projected, for example, on a physical surface or as a hologram, enabling individuals to use this system to observe the virtual objects superimposed on the physical scenery. Specifically, a technology that calculates a camera pose parameter in the real world (also known as the 3-dimension world or the reality world) in real time during a process for camera image acquisition and adds a virtual element to an image captured by the camera based on the camera pose parameter. The virtual element includes but are not limited to an images, a video, and a 3-dimension model. The goal of AR technologies is to connect the virtual world to the real world on a screen for interaction.

The extended reality in some embodiments of the present disclosure can be MR (Mixed Reality): by rendering virtual scene information in a real scene, an interactive feedback information loop is established between the real world, the virtual world, and the user to enhance the realism of user experience. For example, a computer-created sensory input (e.g., a virtual object) is integrated with a sensory input or its representation from a physical set in a simulated set. In some MR sets, the computer-created sensory input can adapt to changes in the sensory input from the physical set. In addition, some electronic systems used to render the MR set can monitor an orientation and/or a position relative to the physical set, so that the virtual objects can interact with a real object (i.e., a physical element or its representations from the physical set). For example, the system can monitor motion so that a virtual plant appear static relative to a physical building.

As shown in FIG. 2, FIG. 2 is a flowchart of a method for display control based on extended reality of an embodiment of the present disclosure, which can be used in an extended reality device, such as a virtual reality device, comprising the following steps.

S11: determining node positions of at least two skeletal nodes of a user in a real space.

In some embodiments, a user performs the method proposed in the embodiments of the present disclosure when using an extended reality device. An visual element such as a control panel and a virtual object is displayed in an extended reality space. A display position of the visual element displayed in the extended reality space depends on positions of the user's skeletal nodes in the real space, therefore node positions of at least two skeletal nodes are obtained first. The skeletal nodes can be, for example, skeletal nodes of a hand (including a palm and fingers) of the user. The node positions can be determined by coordinates.

S12: determining a moving direction, and determining a starting position and a moving distance based on the node positions of the at least two skeletal nodes.

In some embodiments, the moving direction is a predetermined direction, or the moving direction is a direction determined based on the node positions of the at least two skeletal nodes; for example, the moving direction can be set to be perpendicular to a palm of the user. In some embodiments, the starting position and the moving distance are related to the node positions of the at least two skeletal nodes, therefore the starting positions and the moving distances corresponding to different skeletal nodes can be different. The starting position can be pre-bound to the node positions of the skeletal nodes.

S13: travelling, in an extended reality space, the moving distance along the moving direction from the starting position to reach a final position.

S14: displaying a visual element at the final position in the extended reality space.

In some embodiments, a visual elements is displayed in the extended reality space, which can be related to the node positions of the user's skeletal nodes. However, if a display position of the visual element is determined only based on the node positions of the user's skeletal nodes, for example, if the display position of the visual element is set to a position that is obtained by superimposing a certain offset value from the node positions of the skeletal nodes, the visual element may overlap with other body parts of the user. For example, if the display position of the visual element depends on the skeletal nodes of the user's hand, it may cause the visual element in the extended reality space to overlap and intersect with a hand model (which can be a displayed real hand or a hand of an avatar corresponding to the user) when the hand performs actions such as holding and opening, etc. To avoid the overlap and interspersion of the visual element with the hand model, in the embodiments of the present disclosure, the display position of the visual element is based on at least two skeletal nodes. After the starting position is determined—in particular, after the moving direction and the moving distance are determined, the display position of the visual element will change with the node positions of the at least two skeletal nodes. The above-mentioned moving distance is superimposed on the basis of the starting position. As such, when a skeletal node is to overlap with the visual element, the visual element will adjust its final position with the moving distance, and the final position will not overlap with the user's body. Specifically, in some embodiments, in combination with the principle of force feedback, the moving distance is inversely proportional to the spacing distance between the at least two skeletal nodes. The smaller the spacing distances between the at least two skeletal nodes are, i.e., the closer the at least two skeletal nodes are to each other, the greater the moving distance is. Therefore, the visual element is moved to a position far away from the at least two skeletal nodes to avoid overlapping with the at least two skeletal nodes.

In related technologies, the visual element drawing is usually drawn at the display position that is obtained by superimposing an offset value to a fixed hand skeletal node. Drawing the visual element at a fixed display position cannot avoid the overlap problem caused by changes in hand skeleton, which can lead to the visual element to overlap and intersperse with the hand model. In some embodiments of the present disclosure, a moving distance ranging from 0% to 100% is calculated in combination with the principle of force feedback by using node positions of two or more skeletal nodes (such as hand skeletal nodes) as a data source. The visual element drawing superimposes the above-described moving distance on the basis of an original fixed position (the starting position). As such, the visual element will adjust its position with the moving distance when it is to overlap and superimpose with the skeletal nodes, so that the visual element does not overlap with the user's body, thereby solving the problem of overlap and interspersion.

In some embodiments of the present disclosure, determining a starting position based on the node positions of the at least two skeletal nodes comprises performing a difference operation on the node positions of the at least two skeletal nodes, and obtaining the starting position based on an operation result of the difference operation.

In related technologies, a problem with the technology that obtains the display position by superimposing a offset value to the skeletal nodes is that when a position provided by a tracking algorithm is inaccurate or node positions of skeletal nodes of the interactive operation is not stable enough, the visual element will exhibit in a state of shaking. Therefore, in some embodiments of the present disclosure, at least two skeletal nodes are detected and a difference algorithm is used, so that the impact of the shaking of the two skeletal nodes can be at least partially cancelled, thereby mitigating the shaking problem of the visual element.

In some embodiments of the present disclosure, performing a difference operation on the node positions of the at least two skeletal nodes, and determining a starting position based on the node positions of the at least two skeletal nodes comprises: determining a first midpoint on a line connecting a first node position and a second node position as the starting position, wherein the node positions of the at least two skeletal nodes comprise the first node position and the second node position.

In some embodiments, the midpoint of the first node position and the second node position can be directly used as the starting position of the visual element, to mitigate the shaking problem of the visual element due to detection accuracy.

In some embodiments of the present disclosure, performing a difference operation on the node positions of the at least two skeletal nodes, and determining a starting position based on the node positions of the at least two skeletal nodes comprises: determining a first midpoint on the line connecting the first node position and the second node position, and a second midpoint on a line connecting a third node position and a fourth node position, with a third midpoint on a line connecting the first midpoint and the second midpoint being used as the starting position, wherein the node positions of the at least two skeletal nodes comprise the first node position, the second node position, the third node position and the fourth node position.

In some embodiments, there are four skeletal nodes, and at this point, the center positions of the four skeletal nodes are used as the starting position. A shaking amplitude of the starting position can be significantly reduced, and the visual element is displayed stably.

In some embodiments of the present disclosure, at least two skeletal nodes are skeletal nodes of a hand of the user, for example including a palm skeletal node and/or a finger skeletal node. In some embodiments, the visual element follows the hand of the user in the extended reality space, and as the hand of the user moves, the visual elements move correspondingly.

In some embodiments, the node positions of the at least two skeletal nodes comprise: a first node position of a first finger and a second node position of a second finger of a hand; the moving direction is a predetermined direction pointing outward from the hand; and determining a moving distance based on the node positions of the at least two skeletal nodes comprises: determining a first spacing distance between the first node position and the second node position; and determining the moving distance based on the first spacing distance, wherein the moving distance increases as the first spacing distance decreases.

Figure 3:
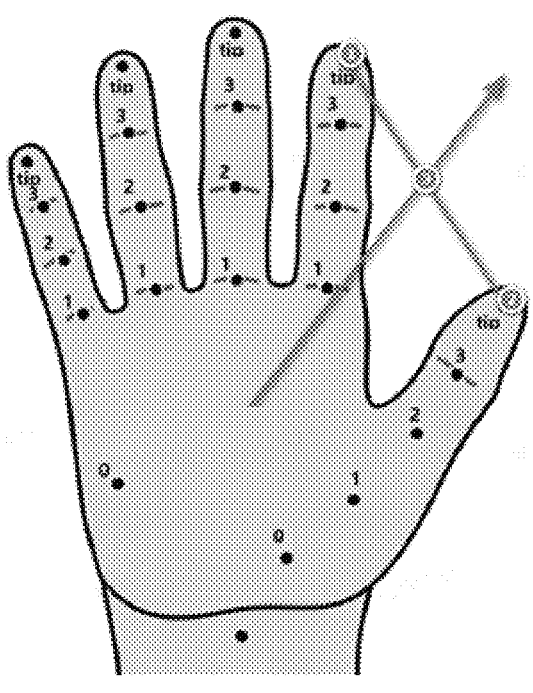
FIGS. 3-6 are schematic diagrams for node positions of skeletal nodes in an embodiment of the present disclosure.

In some embodiments, please refer to FIG. 3, the top of an index finger is a first node position ①, and the top of a thumb is a second node position ②, as shown in FIG. 3. The moving direction can be a direction perpendicular to the palm and same as a direction that the palm is facing. After the first node position and the second node position of the user is detected, a first distance between them is determined, and then a moving distance is determined. Specifically, the maximum and minimum values of the first distance can be predetermined, and the maximum value of the moving distance can be determined. When the first distance equals to its maximum value, the moving distance is 0, and when the first distance equals to its minimum value, the moving distance is the maximum value of the moving distance. In some embodiments, the maximum value of the first distance can be used as the maximum value of the moving distance. At this point, whenever the first distance decreases by a certain distance, the moving distance increases that certain distance correspondingly. This makes the sum of the first distance and the moving distance equal to the maximum value of the first distance. Since the visual element will move away from the palm when the first distance between the first node position and the second node position decreases, the visual element will not overlap with the hand.

In some embodiments of the present disclosure, the node positions of the at least two skeletal nodes comprise: a first finger node position of a first finger, a second finger node position of a second finger, and a palm node position of a palm of a hand; determining a moving direction comprises: determining a first midpoint between the first finger node position and the second finger node position, and determining a direction pointing to the first midpoint from the palm node position as the moving direction; and determining a moving distance based on the node positions of the at least two skeletal nodes comprises: determining a first spacing distance between the first finger node position and the second finger node position; and determining the moving distance based on the first spacing distance, wherein the moving distance increases as the first spacing distance decreases.

Figure 4:
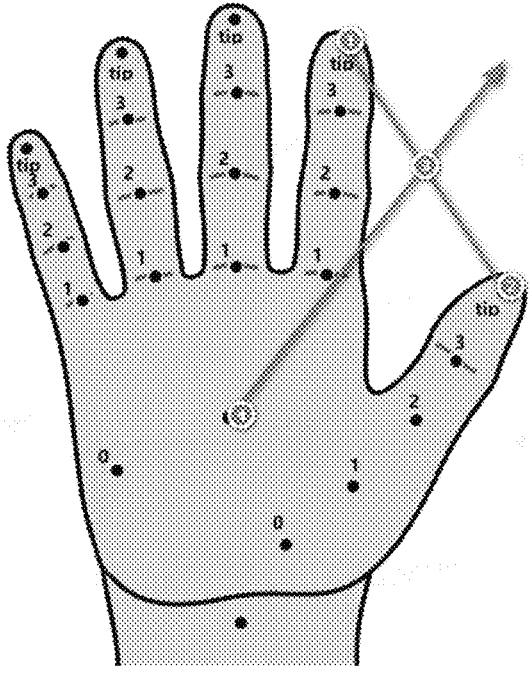

In some embodiments, as shown in FIG. 4, node positions of at least two skeletal nodes include a first finger node position ① at the top of an index finger, a second finger node position ② at the top of a thumb, a palm node position ④ at the palm of a hand. A line is connected between the first finger node position ① and the second finger node position ② to obtain a first midpoint ③ located at the midpoint of the line, and a line connecting the palm node position ④ and the first midpoint ③ is used as a moving direction. The moving distance is determined based on a first spacing distance between the first finger node position ① and the second finger node position ②. The first midpoint ③ can be used as a starting position. When the palm is open, the visual element is located at the first midpoint ③. When the first spacing distance decreases, the visual element will move along the direction from the palm node position ④ to the first midpoint ③, so that the visual element will not overlap with the hand. It should be noted that the position of the first midpoint ③ is determined by the first finger node position ① and the second finger node position ② of the hand currently. Therefore, the position of the first mid ③ changes in real-time. When clenching, there is a height difference that is perpendicular to the palm between the first midpoint ③ and the palm, so the visual element will not be grasped by the palm.

In some embodiments of the present disclosure, the node positions of the at least two skeletal nodes comprise: a first finger node position of a first finger, a second finger node position of a second finger, a third finger node position of a third finger, a fourth finger node position of a fourth finger, a fifth finger node position of a fifth finger, and a palm node position of a palm of a hand; the moving direction comprises a first moving direction parallel to the palm and a second moving direction perpendicular to the palm; determining a moving distance based on the node positions of the at least two skeletal nodes comprises: determining the first moving distance based on spacing distances in a first direction between the first finger node position, the second finger node position, the third finger node position, the fourth finger node position, the fifth finger node position and the palm node position respectively, and determining the second moving distance based on respective spacing distances in a second direction between the first finger node position, the second finger node position, the third finger node position, the fourth finger node position, the fifth finger node position and the palm node position respectively; and in the extended reality space, travelling of the first moving distance is performed along the first moving direction from the starting position and travelling of the second moving distance is performed along the second moving direction to reach the final position.

Figure 5:
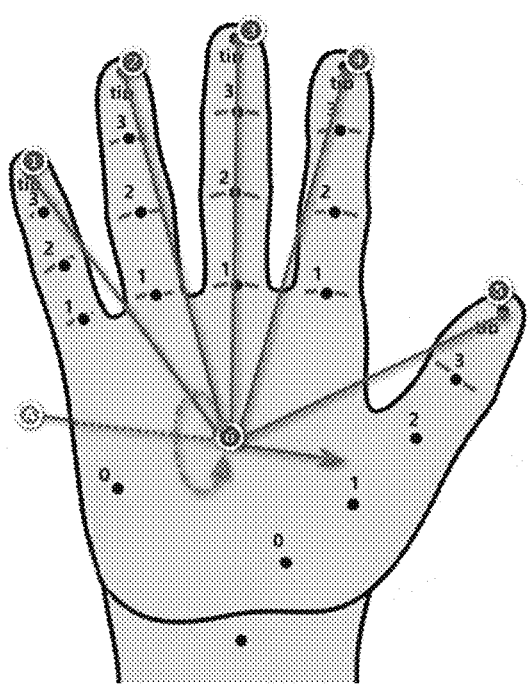

In some embodiments, as shown in FIG. 5, tops of respective fingers are a first finger node position ①, a second finger node position ② of a second finger, a third finger node position ③ of a third finger, a fourth finger node position ④ of a fourth finger, a fifth finger node position ⑤ respectively and a palm node position ⑥ is located in the palm. Spacing distances between the respective finger nodes and the palm node position ⑥D in a first moving direction (parallel to the palm direction) are determined respectively, and a first moving distance in the first moving direction is determined. Specifically, the smaller the spacing distances are, the larger the first moving distance is. The maximum and minimum values of the first moving distance can be predetermined, and the maximum and minimum values of the first moving distance are determined based on the minimum and maximum values of the respective finger nodes to the palm node position ⑥ in the first moving direction. Spacing distances between the respective finger nodes and the palm node position ⑥ in a second moving direction (perpendicular to the palm direction, the direction from point A to point 6 in FIG. 5) are determined, and a second moving distance in the second moving direction is determined. Specifically, the smaller the spacing distances are, the larger the second moving distance is. The maximum and minimum values of the second moving distance can be predetermined, and the maximum and minimum values of the second moving distance are determined based on the minimum and maximum values of the respective finger nodes to the palm node position ⑥ in the second moving direction. A starting position can be set at a position that is obtained by travelling a certain distance from the palm position ⑥ in the second moving direction. The first moving direction can be determined based on lines pointing from the first-fifth finger node positions to the palm node position. For example, the first moving direction can be determined by the following lines: from ① to ⑥, from ② to ⑥, from ③ to ⑥, from ④ to ⑥ and from ⑤ to ⑥. When the finger node positions approach the palm node position along the first direction, the visual element will move away from the palm node position along the first direction and therefore move away from the finger node positions. Similarly, when the finger node positions approach the palm node position along the second direction, the visual element will move away from the palm node position along the second direction and therefore move away from the finger node positions, so that the visual element will not overlap with the hand. travelling of the first moving distance is performed along the first moving direction from the starting position and travelling of the second moving distance is performed along the second moving direction to reach the final position. Therefore, the moving direction is obtained based on a combined effects of the direction perpendicular to the palm and the direction parallel to the palm, and a scaling range of the display position of the visual element is a curve variation of 0 to 100%.

In some embodiments of the present disclosure, the node positions of the at least two skeletal nodes comprise: a first finger node position of a first finger, a second finger node position of a second finger, and a first palm node position, a second palm node position and a third palm node position of the palm on a hand; determining a moving direction comprises: determining a first midpoint between the first finger node position and the second finger node position, determining a second midpoint between the first palm node position and the second palm node position, determining a third midpoint between the first midpoint and the second midpoint, determining a direction pointing to the first midpoint from the second midpoint as a third moving direction and a direction pointing to the third midpoint from the third palm node as a fourth moving direction; determining a moving distance based on the node positions of the at least two skeletal nodes comprising: determining a first spacing distance between the first finger node position and the second finger node position; determining the moving distance based on the first spacing distance; wherein the moving distance increases as the first spacing distance decreases; and in the extended reality space, travelling of the moving distance is performed along the third moving direction from the starting position and travelling of the moving distance is performed along the fourth moving direction to reach the final position.

Figure 6:
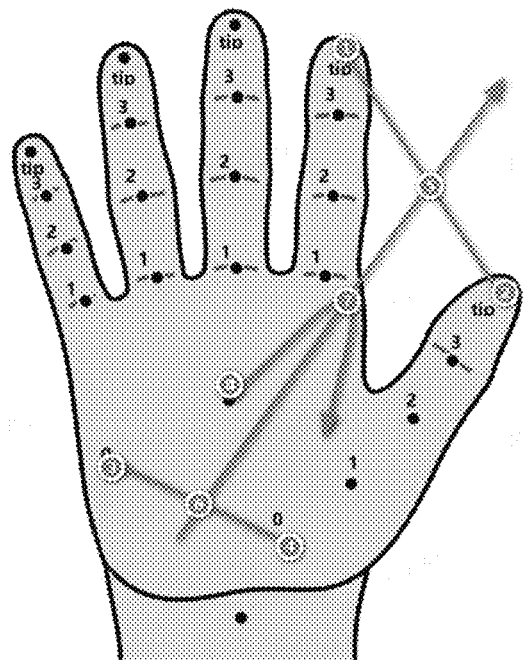

In some embodiments, as shown in FIG. 6, a top of an index finger is a first finger node position ① and a top of a thumb is a second finger node position ②. A first palm node position ③ and a fourth palm node position ④ can be nodes connecting palm skeleton with the thumb and a pinky finger, respectively. The midpoint of a line connecting a first midpoint ⑤ and a second midpoint ⑥ is a third midpoint ⑦, and a direction from the second midpoint ⑥ to the first midpoint ⑤ is a third moving direction. The center of the palm is a third palm node position ⑧, and a direction pointing from the third palm node position ⑧ to the third midpoint ⑦ is a fourth moving direction. A moving distance is determined based on a first spacing distance between the first finger node position ① and the second finger node position ②. Travelling of the above-described moving distance is performed along the third moving direction from the starting position and travelling of the above-described moving distance is performed along the fourth moving direction to reach the final position. Thus, an extension direction is obtained by a superposition of the direction from ⑥ to ⑤ and the direction from ⑧ to ⑦, and a scaling range is a curvature scaling range from 0 to 100%.

In the related technologies, a main reason for the visual element shaking problem is that the fixed position change is overly dependent on the accuracy of the data source. In some embodiments of the present disclosure, difference operations is added in the process of using the data source, so that the visual element drawing position process forms a transition change process, and then the shaking problem is optimized and mitigated.

In related technologies, drawing a visual element at a fixed position cannot avoid the overlap problem due to changes in hand skeleton. This disclosure uses node positions of two or more hand skeletal nodes as data sources to calculate a scaling range of 0-100% in combination with the principle of force feedback. The visual element drawing superimposes the above-described scaling range on the basis of a starting position, so that the visual element will adjust its position with the scaling range when skeletal nodes are to overlap and superimpose, and thereby the problem of overlap and interspersion is solved.

Some embodiments of the present disclosure propose an apparatus for display control based on extended reality, comprising:

a determination unit configured to determine node positions of at least two skeletal nodes of a user in a real space;

the determining unit further configured to determine a moving direction and determining a starting position and a moving distance based on the node positions of the at least two skeletal nodes;

the determining unit further configured to travel, in extended reality space, the moving distance along the moving direction from the starting position to reach a final position; and a display unit configured to display a visual element at the final position in the extended reality space.

For the embodiments of the apparatus, since they basically correspond to the method embodiments, the relevant parts can be referred to partial description of the method embodiments. The apparatus embodiments described above are only illustrative, and a module described as a separate module may or may not be separated. Some or all of the modules can be selected according to actual needs to achieve the purpose of this embodiment solution. Ordinary technicians in this field can understand and implement it without creative labor.

The method and apparatus of the present disclosure have been described based on embodiments and use cases above. In addition, the present disclosure also provides an terminal and a storage medium, which are described below.

Figure 7:
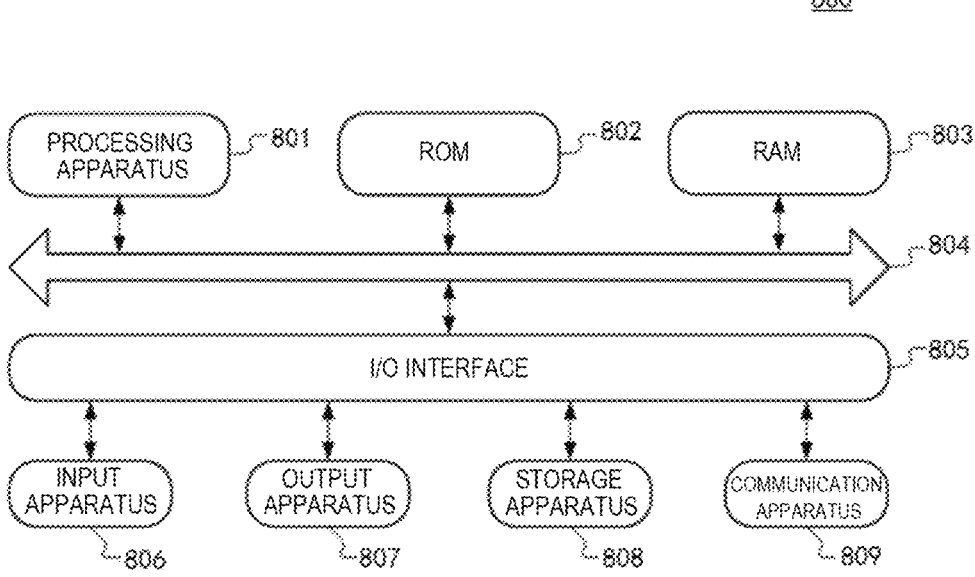
FIG. 7 is a schematic diagram for a structure of a electronic device of an embodiment of the present disclosure.

Referring now to FIG. 7, there is shown a schematic structural diagram of an electronic device (e.g., an terminal device or a server) 800 suitable for implementing an embodiment of the present disclosure. The terminal devices in an embodiment of the present disclosure may include, but are not limited to, mobile terminals such as mobile phones, laptops, digital broadcast receivers, PDAs (personal digital assistants), PADs (tablet computers), PMPs (portable multimedia players), car terminals (e.g., car navigation terminals), etc., and fixed terminals such as digital TVs, desktop computers, etc. The electronic devices shown in the figure is only an example and should not bring any limitation on the functionality and scope of use of the embodiments of the present disclosure.

As shown in FIG. 7, electronic device 800 may include processing devices (such as central processor, graphics processor, etc.) 801, which can perform various appropriate actions and processes based on programs stored in read-only memory (ROM) 802 or loaded from storage device 808 into random access memory (RAM) 803. In RAM 803, various programs and data required for the operation of electronic device 800 are also stored. Processing devices 801, ROM 802, and RAM 803 are connected to each other through bus 804. Input/output (I/O) interface 805 is also connected to bus 804.

Typically, the following devices can be connected to the I/O interface 805: input devices 806, including touch screens, touchpads, keyboards, mice, cameras, microphones, accelerometers, gyroscopes, etc.; output devices 807, including liquid crystal displays (LCDs), speakers, vibrators, etc.; storage devices 808, including magnetic tapes, hard disks, etc.; and communication devices 809. Communication devices 809 can allow electronic devices 800 to communicate wirelessly or wirelessly with other devices to exchange data. Although electronic devices 800 with various devices are shown in the figure, it should be understood that it is not required to implement or have all of the apparatuses shown. More or fewer apparatuses can be implemented or provided instead.

In particular, according to embodiments of the present disclosure, the process described above with reference to the flowchart can be implemented as a computer software program. For example, embodiments of the present disclosure include a computer program product that includes a computer program carried on a computer-readable medium, the computer program containing program code for performing the method shown in the flowchart. In such embodiments, the computer program can be downloaded and installed from the network through the communication device 809, or installed from the storage device 808, or installed from the ROM 802. When the computer program is executed by the processing device 801, the above functions defined in the method of the present disclosure embodiment are performed.

It should be noted that the computer-readable medium described above in this disclosure can be a computer-readable signal medium or a computer-readable storage medium or any combination thereof. The computer-readable storage medium can be, for example—but not limited to—an electrical, magnetic, optical, electromagnetic, infrared, or semiconductor system, device, or any combination thereof. More specific examples of computer-readable storage media can include, but are not limited to, an electrical connection with one or more wires, a portable computer disk, a hard disk, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof. In this disclosure, a computer-readable storage medium can be any tangible medium containing or storing a program that can be used by or in conjunction with an instruction execution system, device, or device. In this disclosure, a computer-readable signal medium can include a data signal propagated in a baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, apparatuses, or devices. The program code contained on the computer-readable medium can be transmitted using any suitable medium, including but not limited to: wires, optical cables, RF (Radio Frequency), etc., or any suitable combination thereof.

In some embodiments, the client and server may communicate using any currently known or future developed network protocol such as HTTP (HyperText Transfer Protocol) and may be interconnected with any form or medium of digital data communication (e.g., a communication network). Examples of communication networks include local area networks ("LANs"), wide area networks ("WANs"), the Internet (e.g., the Internet), and end-to-end networks (e.g., ad hoc end-to-end networks), as well as any currently known or future developed networks.

The above-described computer-readable medium can be included in the electronic device, or it can exist alone and not assembled into the electronic device.

The computer-readable medium carries one or more programs, and when the one or more programs are executed by the electronic device, the electronic device performs the method disclosed above.

Computer program code for performing the operations of the present disclosure may be written in one or more programming languages, or combinations thereof, including Object Oriented programming languages—such as Java, Smalltalk, C++, as well as conventional procedural programming languages—such as "C" or similar programming languages. The program code may be executed entirely on the user's computer, partially on the user's computer, as a standalone software package, partially on the user's computer, or entirely on a remote computer or server. In the case of a remote computer, the remote computer may be connected to the user's computer via any type of network, including a local area network (LAN) or a wide area network (WAN), or may be connected to an external computer (e.g., via the Internet using an Internet service provider).

The flowcharts and block diagrams in the accompanying drawings illustrate the architecture, functions, and operations of the system, method, and computer program product that may be implemented in accordance with various embodiments of the present disclosure. In this regard, each block in the flowcharts or block diagrams may represent a module, program segment, or portion of code that contains one or more executable instructions for implementing a specified logical function. It should also be noted that in some alternative implementations, the functions marked in the blocks may also occur in a different order than those marked in the drawings. For example, two consecutive blocks may actually be executed substantially in parallel, and they may sometimes be executed in the opposite order, depending on the function involved. It should also be noted that each block in the block diagrams and/or flowcharts, as well as combinations of blocks in the block diagrams and/or flowcharts, may be implemented using a dedicated hardware-based system that performs the specified function or operation, or may be implemented using a combination of dedicated hardware and computer instructions.

The units described in an embodiment of the present disclosures can be implemented by software or by hardware. The name of the unit does not limit the unit itself in some cases.

The functions described above herein may be performed at least in part by one or more hardware logic components. For example, without limitation, exemplary types of hardware logic components that may be used include: field programmable gate arrays (FPGAs), application specific integrated circuits (ASICs), application specific standard products (ASSPs), system-on-chip (SOCs), complex programmable logic devices (CPLDs), and the like.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. More specific examples of machine-readable storage media may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, a method for display control based on extended reality is provided, comprising:

determining node positions of at least two skeletal nodes of a user in a real space;

determining a moving direction, and determining a starting position and a moving distance based on the node positions of the at least two skeletal nodes;

travelling, in an extended reality space, the moving distance along the moving direction from the starting position to reach a final position; and displaying a visual element at the final position in the extended reality space.

According to one or more embodiments of the present disclosure, a method for display control based on extended reality is provided, wherein determining a starting position based on the node positions of the at least two skeletal nodes comprises:

performing a difference operation on the node positions of the at least two skeletal nodes, and obtaining the starting position based on an operation result of the difference operation.

According to one or more embodiments of the present disclosure, a method for display control based on extended reality is provided, wherein performing a difference operation on the node positions of the at least two skeletal nodes, and determining a starting position based on the node positions of the at least two skeletal nodes comprises:

determining a first midpoint on a line connecting a first node position and a second node position as the starting position, wherein the node positions of the at least two skeletal nodes comprise the first node position and the second node position; or determining a first midpoint on the line connecting the first node position and the second node position, and a second midpoint on a line connecting a third node position and a fourth node position, with a third midpoint on a line connecting the first midpoint and the second midpoint being used as the starting position, wherein the node positions of the at least two skeletal nodes comprise the first node position, the second node position, the third node position and the fourth node position.

According to one or more embodiments of the present disclosure, a method for display control based on extended reality is provided, wherein at least one of the following is satisfied:

the moving direction being a predetermined direction, or the moving direction being a direction determined based on the node positions of the at least two skeletal nodes;

the final position does not overlapping with the body of the user;

the at least two skeletal nodes being skeletal nodes of a hand of the user; and the visual element following the hand of the user in the extended reality space.

According to one or more embodiments of the present disclosure, a method for display control based on extended reality is provided, wherein the node positions of the at least two skeletal nodes comprise: a first node position of a first finger and a second node position of a second finger of a hand;

the moving direction is a predetermined direction pointing outward from the hand; and determining a moving distance based on the node positions of the at least two skeletal nodes comprises: determining a first spacing distance between the first node position and the second node position; and determining the moving distance based on the first spacing distance, wherein the moving distance increases as the first spacing distance decreases.

According to one or more embodiments of the present disclosure, a method for display control based on extended reality is provided, wherein the node positions of the at least two skeletal nodes comprise: a first finger node position of a first finger, a second finger node position of a second finger, and a palm node position of a palm of a hand;

determining a moving direction comprises: determining a first midpoint between the first finger node position and the second finger node position, and determining a direction pointing to the first midpoint from the palm node position as the moving direction; and determining a moving distance based on the node positions of the at least two skeletal nodes comprises: determining a first spacing distance between the first finger node position and the second finger node position; and determining the moving distance based on the first spacing distance, wherein the moving distance increases as the first spacing distance decreases.

According to one or more embodiments of the present disclosure, a method for display control based on extended reality is provided, wherein the node positions of the at least two skeletal nodes comprise: a first finger node position of a first finger, a second finger node position of a second finger, a third finger node position of a third finger, a fourth finger node position of a fourth finger, a fifth finger node position of a fifth finger, and a palm node position of a palm of a hand;

the moving direction comprises a first moving direction parallel to the palm and a second moving direction perpendicular to the palm;

determining a moving distance based on the node positions of the at least two skeletal nodes comprises: determining the first moving distance based on spacing distances in a first direction between the first finger node position, the second finger node position, the third finger node position, the fourth finger node position, the fifth finger node position and the palm node position respectively, and determining the second moving distance based on respective spacing distances in a second direction between the first finger node position, the second finger node position, the third finger node position, the fourth finger node position, the fifth finger node position and the palm node position respectively; and in the extended reality space, travelling of the first moving distance is performed along the first moving direction from the starting position and travelling of the second moving distance is performed along the second moving direction to reach the final position.

According to one or more embodiments of the present disclosure, a method for display control based on extended reality is provided, wherein the node positions of the at least two skeletal nodes comprise: a first finger node position of a first finger, a second finger node position of a second finger, and a first palm node position, a second palm node position and a third palm node position of the palm on a hand;

determining a moving direction comprises: determining a first midpoint between the first finger node position and the second finger node position, determining a second midpoint between the first palm node position and the second palm node position, determining a third midpoint between the first midpoint and the second midpoint, determining a direction pointing to the first midpoint from the second midpoint as a third moving direction and a direction pointing to the third midpoint from the third palm node as a fourth moving direction;

determining a moving distance based on the node positions of the at least two skeletal nodes comprising: determining a first spacing distance between the first finger node position and the second finger node position; determining the moving distance based on the first spacing distance; wherein the moving distance increases as the first spacing distance decreases; and in the extended reality space, travelling of the moving distance is performed along the third moving direction from the starting position and travelling of the moving distance is performed along the fourth moving direction to reach the final position.

According to one or more embodiments of the present disclosure, an apparatus for display control based on extended reality is provided, comprising:

a determination unit configured to determine node positions of at least two skeletal nodes of a user in a real space;

the determining unit further configured to determine a moving direction and determining a starting position and a moving distance based on the node positions of the at least two skeletal nodes;

the determining unit further configured to travel, in extended reality space, the moving distance along the moving direction from the starting position to reach a final position; and a display unit configured to display a visual element at the final position in the extended reality space.

According to one or more embodiments of the present disclosure, there is provided an terminal comprising: at least one memory and at least one processor;

wherein the at least one memory is configured to store program code, and the at least one processor is configured to recall the program code stored in the at least one memory to perform any of the above-described claims.

According to one or more embodiments of the present disclosure, a computer-readable storage medium is provided for storing program code that, when executed by a computer, causes the computer to perform any of the above-described claims.

The above description is only the better embodiments of the present disclosure and an explanation of the technical principles used. Those skilled in the art should understand that the scope of the disclosure involved in this disclosure is not limited to technical solutions composed of specific combinations of the above technical features but should also cover other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although various operations are depicted in a specific order, this should not be understood as requiring these operations to be performed in the specific order shown or in a sequential order. In certain environments, multitasking and parallel processing may be advantageous. Similarly, although several specific implementation details are included in the above discussion, these should not be construed as limiting the scope of the present disclosure. Certain features described in the context of individual embodiments can also be implemented in combination in a single embodiment. Conversely, various features described in the context of a single embodiment can also be implemented separately or in any suitable sub-combination in multiple embodiments.

Although the subject matter has been described in language specific to structural features and/or methodological logical actions, it should be understood that the subject matter defined in the appended claims is not necessarily limited to the specific features or actions described above. On the contrary, the specific features and actions described above are merely exemplary forms of implementing the claims.

I claim:

1. An electronic device, comprising:

at least one memory and at least one processor;

wherein the at least one memory is configured to store program code, and the at least one processor is configured to recall the program code stored in the at least one memory to perform acts comprising:

determining node positions of at least two skeletal nodes of a user in a real space;

determining a moving direction, and determining a starting position and a moving distance based on the node positions of the at least two skeletal nodes, the moving direction being determined based on a direction relative to at least one of: a hand of the user or a palm of the user;

travelling, in an extended reality space, the moving distance along the moving direction from the starting position to reach a final position; and displaying a visual element at the final position in the extended reality space.

2. The electronic device of claim 1, wherein determining a starting position based on the node positions of the at least two skeletal nodes comprises:

performing a difference operation on the node positions of the at least two skeletal nodes, and obtaining the starting position based on an operation result of the difference operation.

3. The electronic device of claim 2, wherein performing a difference operation on the node positions of the at least two skeletal nodes, and determining a starting position based on the node positions of the at least two skeletal nodes comprises:

determining a first midpoint on a line connecting a first node position and a second node position as the starting position, wherein the node positions of the at least two skeletal nodes comprise the first node position and the second node position; or determining a first midpoint on the line connecting the first node position and the second node position, and a second midpoint on a line connecting a third node position and a fourth node position, with a third midpoint on a line connecting the first midpoint and the second midpoint being used as the starting position, wherein the node positions of the at least two skeletal nodes comprise the first node position, the second node position, the third node position and the fourth node position.

4. The electronic device of claim 1, wherein at least one of the following is satisfied:

the final position does not overlapping with the body of the user;

the at least two skeletal nodes being skeletal nodes of a hand of the user; and the visual element following the hand of the user in the extended reality space.

5. The electronic device of claim 1, wherein the node positions of the at least two skeletal nodes comprise: a first node position of a first finger and a second node position of a second finger of a hand;

wherein the moving direction is a predetermined direction pointing outward from the hand; and wherein determining a moving distance based on the node positions of the at least two skeletal nodes comprises: determining a first spacing distance between the first node position and the second node position; and determining the moving distance based on the first spacing distance, wherein the moving distance increases as the first spacing distance decreases.

6. The electronic device of claim 1, wherein the node positions of the at least two skeletal nodes comprise: a first finger node position of a first finger, a second finger node position of a second finger, and a palm node position of a palm of a hand;

wherein determining a moving direction comprises: determining a first midpoint between the first finger node position and the second finger node position, and determining a direction pointing to the first midpoint from the palm node position as the moving direction; and wherein determining a moving distance based on the node positions of the at least two skeletal nodes comprises: determining a first spacing distance between the first finger node position and the second finger node position; and determining the moving distance based on the first spacing distance, wherein the moving distance increases as the first spacing distance decreases.

7. The electronic device of claim 1, wherein the node positions of the at least two skeletal nodes comprise: a first finger node position of a first finger, a second finger node position of a second finger, a third finger node position of a third finger, a fourth finger node position of a fourth finger, a fifth finger node position of a fifth finger, and a palm node position of a palm of a hand;

wherein the moving direction comprises a first moving direction parallel to the palm and a second moving direction perpendicular to the palm;

wherein determining a moving distance based on the node positions of the at least two skeletal nodes comprises: determining the first moving distance based on spacing distances in a first direction between the first finger node position, the second finger node position, the third finger node position, the fourth finger node position, the fifth finger node position and the palm node position respectively, and determining the second moving distance based on respective spacing distances in a second direction between the first finger node position, the second finger node position, the third finger node position, the fourth finger node position, the fifth finger node position and the palm node position respectively; and wherein in the extended reality space, travelling of the first moving distance is performed along the first moving direction from the starting position and travelling of the second moving distance is performed along the second moving direction to reach the final position.

8. The electronic device of claim 1, wherein the node positions of the at least two skeletal nodes comprise: a first finger node position of a first finger, a second finger node position of a second finger, and a first palm node position, a second palm node position and a third palm node position of the palm on a hand;

wherein determining a moving direction comprises: determining a first midpoint between the first finger node position and the second finger node position, determining a second midpoint between the first palm node position and the second palm node position, determining a third midpoint between the first midpoint and the second midpoint, determining a direction pointing to the first midpoint from the second midpoint as a third moving direction and a direction pointing to the third midpoint from the third palm node as a fourth moving direction;

wherein determining a moving distance based on the node positions of the at least two skeletal nodes comprising: determining a first spacing distance between the first finger node position and the second finger node position; determining the moving distance based on the first spacing distance; wherein the moving distance increases as the first spacing distance decreases; and wherein in the extended reality space, travelling of the moving distance is performed along the third moving direction from the starting position and travelling of the moving distance is performed along the fourth moving direction to reach the final position.

9. A non-transitory computer-readable storage medium for storing program code that, when executed by a computer, causes the computer to perform acts comprising:

determining node positions of at least two skeletal nodes of a user in a real space;

determining a moving direction, and determining a starting position and a moving distance based on the node positions of the at least two skeletal nodes, the moving direction being determined based on a direction relative to at least one of: a hand of the user or a palm of the user;

travelling, in an extended reality space, the moving distance along the moving direction from the starting position to reach a final position; and displaying a visual element at the final position in the extended reality space.

10. The non-transitory computer-readable storage medium of claim 9, wherein determining a starting position based on the node positions of the at least two skeletal nodes comprises:

performing a difference operation on the node positions of the at least two skeletal nodes, and obtaining the starting position based on an operation result of the difference operation.

11. The non-transitory computer-readable storage medium of claim 10, wherein performing a difference operation on the node positions of the at least two skeletal nodes, and determining a starting position based on the node positions of the at least two skeletal nodes comprises:

determining a first midpoint on a line connecting a first node position and a second node position as the starting position, wherein the node positions of the at least two skeletal nodes comprise the first node position and the second node position; or determining a first midpoint on the line connecting the first node position and the second node position, and a second midpoint on a line connecting a third node position and a fourth node position, with a third midpoint on a line connecting the first midpoint and the second midpoint being used as the starting position, wherein the node positions of the at least two skeletal nodes comprise the first node position, the second node position, the third node position and the fourth node position.

12. The non-transitory computer-readable storage medium of claim 9, wherein at least one of the following is satisfied:

the final position does not overlapping with the body of the user;

the at least two skeletal nodes being skeletal nodes of a hand of the user; and the visual element following the hand of the user in the extended reality space.

13. A method for display control based on extended reality, comprising:

determining node positions of at least two skeletal nodes of a user in a real space;

determining a moving direction, and determining a starting position and a moving distance based on the node positions of the at least two skeletal nodes, the moving direction being determined based on a direction relative to at least one of: a hand of the user or a palm of the user;

travelling, in an extended reality space, the moving distance along the moving direction from the starting position to reach a final position; and displaying a visual element at the final position in the extended reality space.

14. The method of claim 13, wherein determining a starting position based on the node positions of the at least two skeletal nodes comprises:

performing a difference operation on the node positions of the at least two skeletal nodes, and obtaining the starting position based on an operation result of the difference operation.

15. The method of claim 14, wherein performing a difference operation on the node positions of the at least two skeletal nodes, and determining a starting position based on the node positions of the at least two skeletal nodes comprises:

determining a first midpoint on a line connecting a first node position and a second node position as the starting position, wherein the node positions of the at least two skeletal nodes comprise the first node position and the second node position; or determining a first midpoint on the line connecting the first node position and the second node position, and a second midpoint on a line connecting a third node position and a fourth node position, with a third midpoint on a line connecting the first midpoint and the second midpoint being used as the starting position, wherein the node positions of the at least two skeletal nodes comprise the first node position, the second node position, the third node position and the fourth node position.

16. The method of claim 13, wherein at least one of the following is satisfied:

the final position does not overlapping with the body of the user;

the at least two skeletal nodes being skeletal nodes of a hand of the user; and the visual element following the hand of the user in the extended reality space.

17. The method of claim 13, wherein the node positions of the at least two skeletal nodes comprise: a first node position of a first finger and a second node position of a second finger of a hand;

wherein the moving direction is a predetermined direction pointing outward from the hand; and wherein determining a moving distance based on the node positions of the at least two skeletal nodes comprises: determining a first spacing distance between the first node position and the second node position; and determining the moving distance based on the first spacing distance, wherein the moving distance increases as the first spacing distance decreases.

18. The method of claim 13, wherein the node positions of the at least two skeletal nodes comprise: a first finger node position of a first finger, a second finger node position of a second finger, and a palm node position of a palm of a hand;

wherein determining a moving direction comprises: determining a first midpoint between the first finger node position and the second finger node position, and determining a direction pointing to the first midpoint from the palm node position as the moving direction; and wherein determining a moving distance based on the node positions of the at least two skeletal nodes comprises: determining a first spacing distance between the first finger node position and the second finger node position; and determining the moving distance based on the first spacing distance, wherein the moving distance increases as the first spacing distance decreases.

19. The method of claim 13, wherein the node positions of the at least two skeletal nodes comprise: a first finger node position of a first finger, a second finger node position of a second finger, a third finger node position of a third finger, a fourth finger node position of a fourth finger, a fifth finger node position of a fifth finger, and a palm node position of a palm of a hand;

wherein the moving direction comprises a first moving direction parallel to the palm and a second moving direction perpendicular to the palm;

wherein determining a moving distance based on the node positions of the at least two skeletal nodes comprises: determining the first moving distance based on spacing distances in a first direction between the first finger node position, the second finger node position, the third finger node position, the fourth finger node position, the fifth finger node position and the palm node position respectively, and determining the second moving distance based on respective spacing distances in a second direction between the first finger node position, the second finger node position, the third finger node position, the fourth finger node position, the fifth finger node position and the palm node position respectively; and wherein in the extended reality space, travelling of the first moving distance is performed along the first moving direction from the starting position and travelling of the second moving distance is performed along the second moving direction to reach the final position.

20. The method of claim 13, wherein the node positions of the at least two skeletal nodes comprise: a first finger node position of a first finger, a second finger node position of a second finger, and a first palm node position, a second palm node position and a third palm node position of the palm on a hand;

wherein determining a moving direction comprises: determining a first midpoint between the first finger node position and the second finger node position, determining a second midpoint between the first palm node position and the second palm node position, determining a third midpoint between the first midpoint and the second midpoint, determining a direction pointing to the first midpoint from the second midpoint as a third moving direction and a direction pointing to the third midpoint from the third palm node as a fourth moving direction;

wherein determining a moving distance based on the node positions of the at least two skeletal nodes comprising: determining a first spacing distance between the first finger node position and the second finger node position; determining the moving distance based on the first spacing distance; wherein the moving distance increases as the first spacing distance decreases; and wherein in the extended reality space, travelling of the moving distance is performed along the third moving direction from the starting position and travelling of the moving distance is performed along the fourth moving direction to reach the final position.

* * * * *